Nov. 21, 1967  M. G. COMBES  3,353,786
GATE VALVE BODY INCLUDING THIN DISHED PLATES
Filed Sept. 3, 1965  4 Sheets-Sheet 2

INVENTOR.
MARVIN G. COMBES
BY Gregg & Stidham
ATTORNEYS

Nov. 21, 1967        M. G. COMBES        3,353,786
GATE VALVE BODY INCLUDING THIN DISHED PLATES
Filed Sept. 3, 1965        4 Sheets-Sheet 3
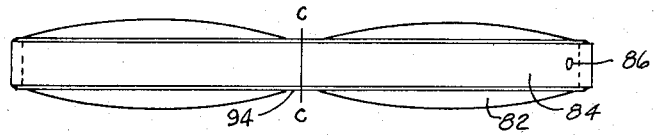
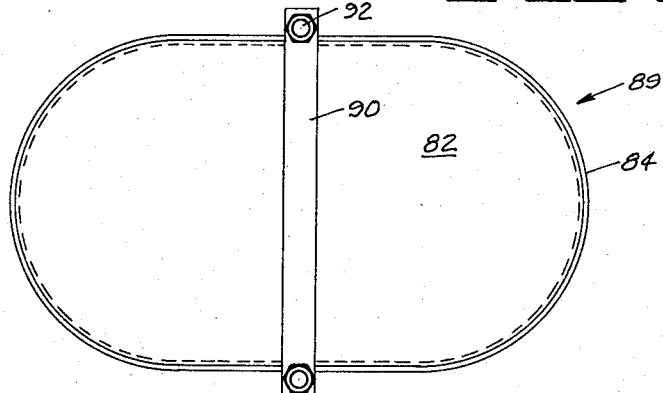
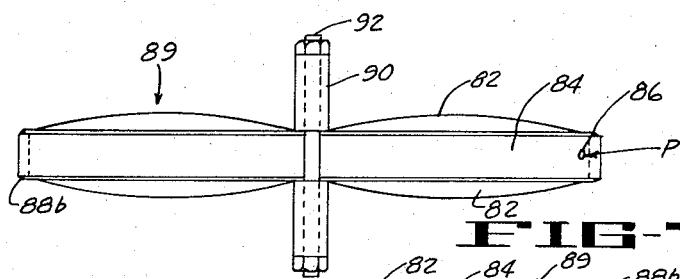
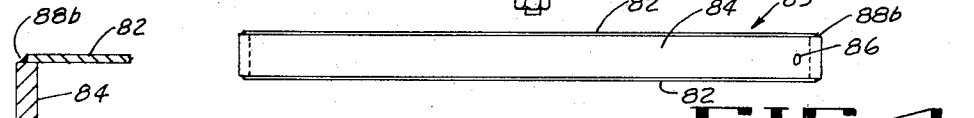
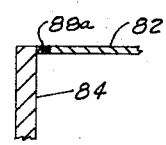
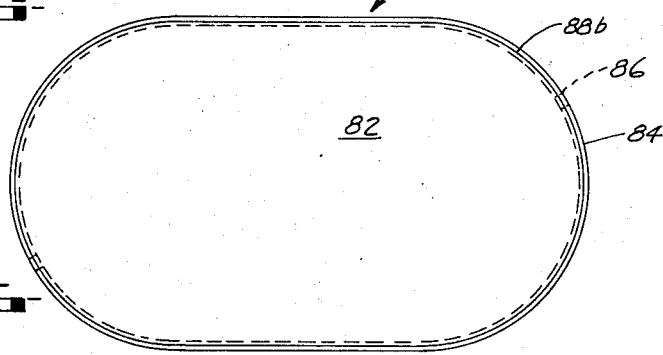
INVENTOR.
MARVIN G. COMBES
BY Gregg & Stidham
ATTORNEYS Nov. 21, 1967 M. G. COMBES 3,353,786
GATE VALVE BODY INCLUDING THIN DISHED PLATES
Filed Sept. 3, 1965 4 Sheets-Sheet 4
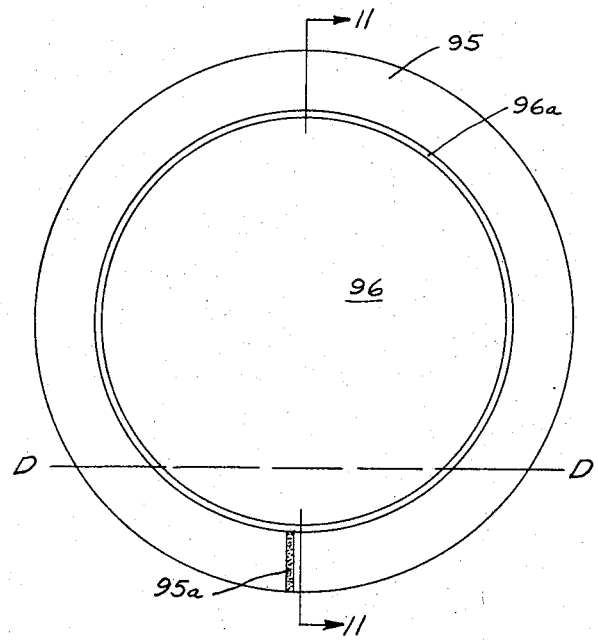
FIG-10-
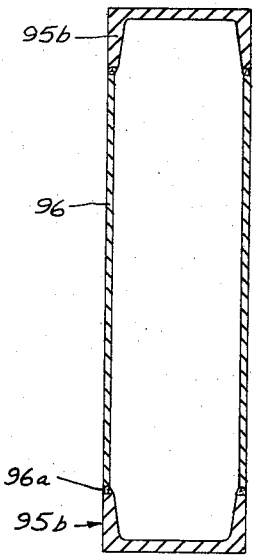
FIG-11-
FIG-13-
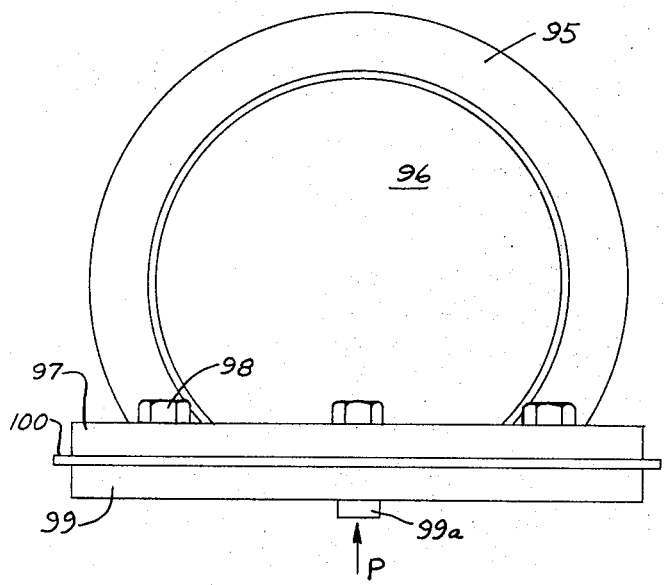
FIG-12-
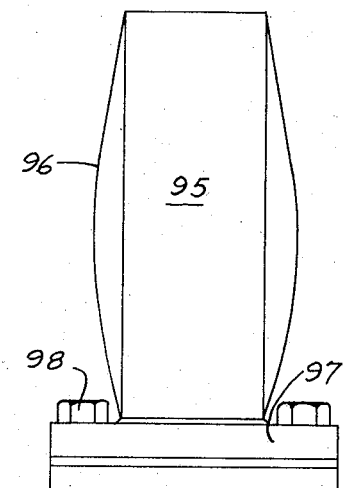
INVENTOR.
MARVIN G. COMBES
BY Gregg & Stidham
ATTORNEYS United States Patent Office 3,353,786
Patented Nov. 21, 1967

3,353,786
GATE VALVE BODY INCLUDING THIN DISHED PLATES
Marvin G. Combes, Castro Valley, Calif., assignor to Grove Valve and Regulator Company, Oakland, Calif., a corporation of California
Filed Sept. 3, 1965, Ser. No. 484,891
6 Claims. (Cl. 251—329)

ABSTRACT OF THE DISCLOSURE

A valve body formed of two sections, one made up of relatively thick plates to accommodate bolt holes for connection in a pipe line. The other section has thin plates which are dished outward to form concave, generally spherical inner surfaces providing maximum strength with minimum weight.

*Description*

This invention relates to a valve construction and more particularly, to a low pressure pipeline valve constructed through extensive use of relatively thin metal.

Conventional valve structures, the bodies of which are cast or fabricated from metal plates, are commonly made with wall thicknesses adequate to withstand internal pressures which may be substantially in excess of pressures actually encountered in many installations. For example, some pipelines carry fluids at relatively low pressures of 100 p.s.i. to 200 p.s.i., and relatively thin gauge material could be employed in the manufacture of valves if it were feasible to do so. Some valves are designed for installation in pipelines ranging in size up to 60 inches in diameter and, where wall thicknesses are greater than required, a substantial amount of metal may be wasted. However, in valve constructions heretofore employed, the design requirements for even the lower pressures do not produce a sufficient saving of material to justify stocking additional valve lines. Moreover, in sandwich type disc or gate valves wherein a body band is secured between two plates with a valve closure disc movable between them, the end wall plates have to be of sufficient thickness in any event to accommodate screws for coupling the valve into a pipeline.

It is, therefore, an object of this invention to provide a valve construction wherein thin gauge material is employed for substantial portions of the valve body.

It is a further object of this invention to provide a valve construction using thin metal, the strength of which is enhanced to increase resistance to internal and external pressures.

In carrying out this invention, I provide a valve body that is formed of two major sections, a lower section of relatively thick material to provide rigidity and to accommodate means for coupling the valve into a pipeline, and an upper section of relatively thin metal which has been expanded outward so that the inner surfaces are concave for added strength. Both body sections have generally rectangular cross sections at the joint between them, and they are preferably joined by means of complementary flanges on the sections.

Other objects and advantages of this invention will become apparent from the description following when read in conjunction with the accompanying drawings wherein:

FIGS. 3 and 4 are top and elevation views, respectively, of an enclosure from which two upper gate valve bodies may be formed;

FIGS. 5 and 6 illustrate different types of welds that may be employed;

FIGS. 7 and 8 are elevation and top views of the enclosure being clamped and expanded;

FIG. 9 is an elevation view of the expanded enclosure with clamp removed; and

FIG. 10 is an elevation view of an enclosure from which another form of upper valve section may be made;

FIG. 11 is a vertical section view taken along line 11—11 of FIG. 10;

FIG. 12 is a front view of an upper valve section completed from the form of FIG. 10; and FIG. 13 is a side view of the upper valve section of FIG. 11.

Figure 1:
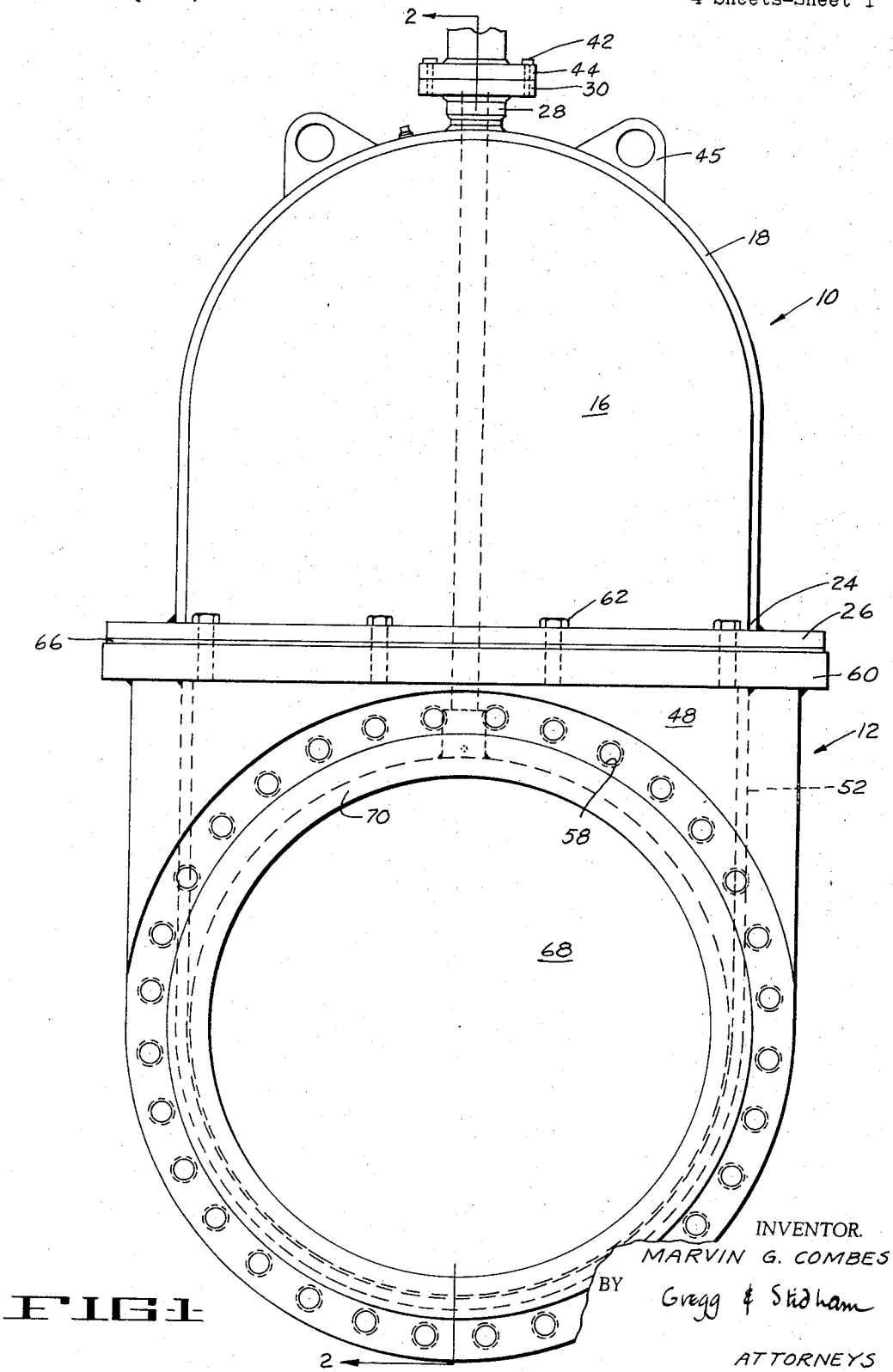
FIG. 1 is a front elevation of a gate valve embodying features of this invention.
Figure 2:
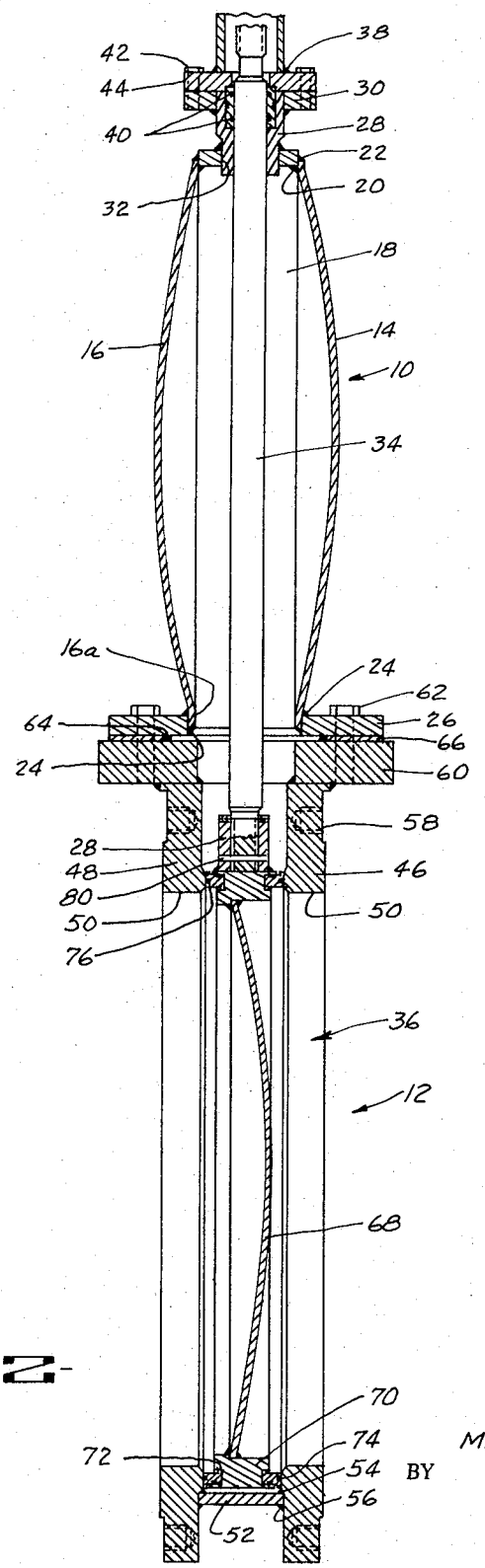
FIG. 2 is a vertical section view of the gate valve taken along line 2—2 of FIG. 1.

Referring now more particularly to FIGS. 1 and 2, the valve body of this invention comprises an upper body portion or bonnet 10 secured to a relatively thicker lower body portion 12. The upper body portion comprises a pair of opposing end walls 14 and 16 around the outer edges of which are secured an inverted U-shaped body band 18, as by welding around the peripheries thereof. Preferably, the end walls are welded around the body band both internally at 20 and externally at 22. The body band is of somewhat thicker gauge than the end walls 14 and 16, and the end walls are expanded outward by a method hereinafter to be described so that the inner surfaces are concave, thus forming walls that provide increased resistance to bending under both internal and external pressures. The lower end 24 of the upper body section is of generally rectangular cross section and is welded to a complementary flange 26.

A valve stem slide bearing 28 including a flange 30 is secured at the top of the body band 18 within an opening 32 to accommodate the valve stem 34 to which is secured a gate disc hereinafter to be described. A seal ring retainer 38 is accommodated within the bearing member and is provided with suitable seal means such as O-rings 40 to effect a seal between the stem and the bearing. A valve operator (not shown) is secured to the flange 30 by means of capscrews 42 passing through a complementary flange 44. Suitable eyes 45 may also be welded to the body band 18 to facilitate handling the valve.

The lower body portion 12 is, in its preferred form, formed of relatively thick metal plate end plates 46 and 48, each including fluid passage openings 50, and between the end plates 46 and 48 is secured a U-shaped body band 52 which may be sealed as by welding, preferably both inside and out, as at 54 and 56. The end plates 46 and 48 are provided with a circular series of tapped holes 58 for attachment to the flange of a pipe section and a rectangular flange 60 is welded to the flat upper ends of the end plates 46 and 48 and the body band 52.

When assembling the valve body, the complementary flanges 26 and 60 of the upper and lower sections 10 and 12 are secured together as by means of capscrews 62 and the joint is sealed by means of an O-ring 64, embraced by the thin ring 66 which functions as an O-ring retainer.

The valve closure disc 36 comprises a dished disc 68 which is welded within a rigid seat ring carrier ring 70 having annular recesses 72 in its outer faces to accommodate seat rings 74 which seal against complementary working surfaces 76 on the inner surfaces of the end plates 46 and 48. The closure disc or gate 36 is attached to the stem 34 by threaded engagement of the stem within a sleeve 78 which is welded to the top of the seat ring carrier ring 70. A lock pin 80 is inserted to insure that the stem 34 is not inadvertently removed from the sleeve 78.

Referring now to FIGS. 3 through 9, one method of fabricating the upper valve body section will be described. First, a pair of oval plates 82 are formed and they are welded around their edges to opposite edges of a continuous body band 84 in which an inlet opening 86 has been bored. As shown in FIGS. 5 and 6, the oval plate 82 may be slightly smaller than the body band 84 with the weld material 88a serving to fill the gap, or it may be large enough to be supported on the band and the corner filled with weld material 88b. After the plates 82 are so welded to the body band 84 to form a sealed enclosure 89, a pair of rigid retainer bars 90 are placed across the mid-portion of the plates and are fixed relative to each other by means of tightening the studs 92. Then, a fluid is introduced through the inlet opening 86 at a pressure P sufficient to cause the plates 82 to expand and stretch outward, but preferably not sufficient to bend the body band 84 excessively. Because the fluid exerts pressure equally over the areas of the plates 82 to dish them outward, their inner surfaces are inherently generally spherical providing maximum strength. The retainer bars 90 and the studs 92 are of sufficient strength to resist bending, and they may be secured firmly against the plates so that, as shown in FIG. 9, a strip across the mid-portion is left undeformed in rectangular cross-section. If desired, however, they may be spaced slightly from the plates to permit some slight but restricted expansion. Thus, the enclosure 89 formed by the oval plates 82 and the body band 84 has two sections wherein the plates 82 are expanded outward near the centers of curvature of the two arcuate portions of the body band, but at the midstrip 94 it is of approximately its original cross-section.

After the enclosure 89 is deformed, it is severed along line C—C within the relatively undeformed midstrip 94 to form two separate open end upper valve body sections having convex outer walls and, hence, concave inner walls which provide added strength and resistance to pressures exerted in either direction. Then, the rectangular flange 26 is welded onto the relatively undeformed portion adapting the upper body section for connection to the lower body section, and the body band is bored to receive the valve stem bearing member 28 which is welded in place. Finally, the O-ring 64 and O-ring retainer 66 are placed between the flanges 26 and 60, and the capscrews are tightened to complete the valve body.

Referring now to FIGS. 10 to 13, I have disclosed another form of upper valve body section wherein the body band is formed by bending a channel 95 into a circular loop and welding the ends together at 95a. Then, a pair of circular discs 96 are welded at 96a around their circumferences to the inner edges of the channel legs 95b. Since the plates 96 are of circular configuration they are easily positioned within the complementary circular edges of the channel legs 95b without precision placement. In addition, since the weld 96a is spaced inward from the outer periphery of the body band 95 rather than at the corner there is a reduced tendency for the plates 96 to separate from the body band during expansion. That is, when sheets are welded to a plane strip to form the corner of the valve body, they tend to spread apart into a greater corner angle during expansion, placing the weld under stress. On the other hand, with the weld spaced from the corner, the legs of the channel member 95 tend to bend outward with the plates 96, reducing the stress on the weld. Thus, in FIGS. 10 to 13 the upper body section differs in two respects from that of FIGS. 1 to 9; it is circular and the body band is a channel member. It is obvious, therefore, that the features are interchangeable with those of the first embodiment and that an oval body may be formed with a channel body band or a circular body may have a strip body band.

In completing the valve body section, a similar restraining member may be placed over the sheets so that they will not be deformed excessively at the cross-section wherein they are to be attached to a flange. In the alternative, a flange 97 may be welded directly to the body to serve as the retainer, and the body severed along the line D—D before or after expansion. If the body is severed first, a solid plate 99 may be bolted at 98 to the flange with an inlet 99a in the plate for pressure fluid as indicated by the arrow P. A diaphragm or other seal 100 will render the structure fluid-tight as the sheets 96 are expanded outward to the configuration shown in FIG. 13, inherently forming generally spherical surfaces.

While I have described this invention in connection with preferred embodiments thereof, it is obvious that modifications and changes therein may be made by those skilled in the art without departing from the spirit and scope of this invention as defined by the claims appended hereto.

Having described my invention, I claim:

1. A valve structure comprising:
a first body section having opposing end walls of relatively thick material with flow openings therethrough,
a second body section having opposing end walls of thin material which are dished outward forming concave, generally spherical, inner surfaces, and
a body band secured between the edges of said thin end walls,
said body band being a channel member,
said thin end walls being welded around their peripheries to the legs of said channel member,
complementary means securing said body sections together to form a complete valve body enclosure.

2. A valve structure comprising:
an open-ended first body section with end walls of relatively thick material, and
means forming flow openings through said end walls,
a generally rectangular first flange around the open end of said first body section, and
means for securing pipe sections to said end walls,
a second body section comprising:
a second flange with a generally rectangular opening therein,
opposing relatively thin end walls secured to said flange along opposite sides of said opening,
a body band secured between the edges of said thin end walls,
said body band being a channel member and said thin end walls being welded to the legs of said channel member,
said thin end walls being dished outward to form concave, generally spherical, inner surfaces, and
means securing said first and second flanges together.

3. A valve structure defined by claim 2 wherein:
said first body section is the lower section,
a U-shaped body strip being secured between said thick end walls to form said side and bottom walls,
said second body section is the upper section, and
said body band is of inverted U-shaped configuration and is secured between the edges of said thin end walls and to said flange along opposite ends of said opening.

4. A valve structure defined by claim 2 wherein:
said first body section is the lower section,
a U-shaped body strip being secured between said end walls to form said side and bottom walls, and
said second body section is the upper section.

5. The valve structure defined by claim 2 wherein:
said channel body band is formed into a major portion of a circular ring.

6. A valve structure comprising:
an open-ended first body section with end walls of relatively thick material, and
means forming flow openings through said end walls,
a first flange around the open end of said first body section, and
means for securing pipe sections to said end walls,
a complementary second flange with an opening therein, opposing relatively thin end walls secured to said flange in and around said opening, a body band secured between the edges of said thin end walls, said body band being a channel member, said thin end walls being welded around their peripheries to the legs of said channel member, said end walls being dished outward to form concave, generally spherical, inner surfaces, and means securing said first and second flanges together.

References Cited

UNITED STATES PATENTS

| | | | |
|---|---|---|---|
| 685,438 | 10/1901 | Warburton | 251—329 X |
| 2,683,581 | 7/1954 | Rovang | 251—329 X |
| 3,052,963 | 9/1962 | Williams | 251—329 X |
| 3,176,956 | 4/1965 | Englert et al. | 251—329 |

FOREIGN PATENTS

| | | |
|---|---|---|
| 417,512 | 10/1934 | Great Britain. |
| 1,171,258 | 9/1958 | France. |
| 1,002,580 | 2/1957 | Germany. |

OTHER REFERENCES

German printed application 1,002,580, February 1957.

M. CARY NELSON, *Primary Examiner.*

ARNOLD ROSENTHAL, *Examiner.*